(12) United States Patent
Skafidas et al.

(10) Patent No.: US 7,248,877 B2
(45) Date of Patent: Jul. 24, 2007

(54) MULTIPLE ACCESS WIRELESS COMMUNICATIONS ARCHITECTURE

(75) Inventors: Efstratios Skafidas, Coburg (AU); Ben Jones, Austin, TX (US); Antonio Torrini, Austin, TX (US); John Jack Morton, Austin, TX (US); Eric Crawford, Austin, TX (US); Mike Gibson, Austin, TX (US); William John Rinderknecht, Austin, TX (US); Mark William Benson, Austin, TX (US); Neil Patrick Kelly, Austin, TX (US); Nestor Fesas, Austin, TX (US); Michael Casey Luther, Austin, TX (US); Blaine Kohl, Austin, TX (US)

(73) Assignee: Bandspeed, Inc., Austin, TX (US)

( * ) Notice: Subject to any disclaimer, the term of this patent is extended or adjusted under 35 U.S.C. 154(b) by 424 days.

(21) Appl. No.: 10/615,208

(22) Filed: Jul. 7, 2003

(65) Prior Publication Data

US 2004/0102222 A1 May 27, 2004

Related U.S. Application Data

(60) Provisional application No. 60/428,456, filed on Nov. 21, 2002.

(51) Int. Cl.
*H04Q 7/20* (2006.01)
(52) U.S. Cl. .................. 455/450; 455/452.1; 455/464; 455/41.2; 455/500
(58) Field of Classification Search ................ 455/450, 455/452.1, 452.2, 464, 41.2, 500, 509, 516
See application file for complete search history.

(56) References Cited

U.S. PATENT DOCUMENTS 5,164,942 A * 11/1992 Kamerman et al. ......... 370/334
5,515,378 A    5/1996 Roy, III et al.

(Continued)

FOREIGN PATENT DOCUMENTS

EP    0559980 A1    9/1993

(Continued)

OTHER PUBLICATIONS

European Patent Office, "Communication Pursuant to Article 96(2) EPC," Office Action for EP Application No. 03 783 375.3, dated Nov. 21, 2005, 4 pages.

(Continued)

*Primary Examiner*—Matthew Anderson
*Assistant Examiner*—Minh Dao
(74) *Attorney, Agent, or Firm*—Hickman Palermo Truong & Becker LLP; Edward A. Becker (57) ABSTRACT

A multiple access wireless communications architecture provides selective, simultaneous communications with wireless devices located in different sections of a spatial area around a communications apparatus referred to as "sectors". This includes communications between wireless devices in a single sector, between wireless devices in different sectors and between wireless devices and a wired network or wireless backhaul network. The wireless communications architecture generally includes two or more wireless antenna arrangements that are each configured to provide communications with wireless devices located in a particular sector. Each wireless antenna arrangement is further configured to determine whether signals are being communicated on a communications channel before transmitting on the communications channel. This may be implemented, for example, using a carrier sense or energy detection mechanism. Wireless devices within a sector may communicate on the same or different communications channels, depending upon the particular multiple access protocol employed. For example, TDMA or CSMA may be used to allow wireless devices in a sector to share communications channels. Communications channels may also be used simultaneously in different sectors by different wireless devices.

25 Claims, 5 Drawing Sheets

U.S. PATENT DOCUMENTS

| | | | |
|---|---|---|---|
| 5,553,316 | A | 9/1996 | Diepstraten et al. |
| 5,666,654 | A | 9/1997 | Kanai |
| 5,835,859 | A | 11/1998 | Doner |
| 5,946,631 | A * | 8/1999 | Melnik ..................... 455/522 |
| 6,140,972 | A | 10/2000 | Johnston et al. |
| 6,218,990 | B1 | 4/2001 | Grangeat et al. |
| 6,236,866 | B1 | 5/2001 | Meyer et al. |
| 6,323,810 | B1 | 11/2001 | Poilasne et al. |
| 6,633,769 | B2 * | 10/2003 | Shoobridge ................ 455/574 |
| 6,687,503 | B1 * | 2/2004 | Porter et al. ............. 455/452.1 |
| 6,990,338 | B2 * | 1/2006 | Miller et al. ............... 455/431 |
| 2001/0044308 | A1 | 11/2001 | Klank |
| 2002/0107024 | A1 | 8/2002 | Dev Roy |
| 2002/0149534 | A1 | 10/2002 | Bobier |
| 2003/0054829 | A1 | 3/2003 | Moisio |
| 2003/0064745 | A1 | 4/2003 | Benveniste |
| 2003/0078049 | A1 | 4/2003 | Klank |
| 2003/0087645 | A1 | 5/2003 | Kim et al. |
| 2003/0210665 | A1 | 11/2003 | Salmenkaita et al. |
| 2004/0095907 | A1 | 5/2004 | Agee et al. |
| 2004/0102222 | A1 * | 5/2004 | Skafidas et al. .......... 455/562.1 |
| 2004/0203873 | A1 * | 10/2004 | Gray ...................... 455/456.1 |
| 2004/0204114 | A1 * | 10/2004 | Brennan et al. .......... 455/562.1 |
| 2004/0259558 | A1 * | 12/2004 | Skafidas et al. ............ 455/450 |
| 2004/0259563 | A1 | 12/2004 | Morton et al. |
| 2005/0141545 | A1 * | 6/2005 | Fein et al. .................. 370/445 |
| 2005/0181723 | A1 * | 8/2005 | Miller et al. .............. 455/12.1 |
| 2006/0025150 | A1 * | 2/2006 | Kim et al. .................. 455/453 |

FOREIGN PATENT DOCUMENTS

| | | |
|---|---|---|
| EP | 1 096 730 A1 | 5/2001 |
| EP | 1156689 A1 | 11/2001 |
| EP | 1 231 807 A3 | 8/2002 |
| WO | WO 97/14259 | 4/1997 |
| WO | WO 98/24258 | 6/1998 |
| WO | WO 98/24258 A2 | 6/1998 |
| WO | WO 01/39538 A1 | 5/2001 |
| WO | WO 02/05382 A1 | 1/2002 |
| WO | WO 02/41449 A2 | 5/2002 |
| WO | WO 03/026221 A1 | 3/2003 |
| WO | WO 2004/049747 A2 | 6/2004 |

OTHER PUBLICATIONS

Current Claims, EP Application No. 03 783 375.3, 7 pages.
International Searching Authority, "Notification of Transmittal of the International Search Report and the Written Opinion of the International Searching Authority, or the Declaration," PCT/US2004/023901, dated Jul. 7, 2005, 21 pages.
Current Claims, PCT/US2004/023949, 14 pages.
International Searching Authority, "Notification of Transmittal of the International Search Report and the Written Opinion of the International Searching Authority, or the Declaration," PCT/US2004/023949, dated Jun. 28, 2005, 22 pages.
Gomes, Fernando C., "Reactive GRASP with Path Relinking for Channel Assignment in Mobile Phone Networks," XP-001099662, pp. 60-67.
Current Claims of International Patent Application PCT/US 03/36179 (9 pgs).
International Preliminary Examining Authority, International Preliminary Examination Report, Patent Application PCT/US03/36179, dated May 5, 2005, 13 pages.
Current Claims of International Patent Application PCT/US 03/36179 (7 pgs).
International Preliminary Examining Authority, Written Opinion, Patent Application PCT/US 03/36179, dated Feb. 7, 2005, 11 pages.
Mark J. Vaughan, et al., "InP-Based 28 GHz Integrated Antennas for Point-to-Multipoint Distribution", High Speed Semiconductor Devices and Circuits, Cornell University, Ithaca, NY., Aug. 7, 1995, pp. 75-84.
Benenson, L S., et al., "Decoupling of Antennas by Means of Periodic Structures", Sovient Journal of Communications Technology and Electronics, SCRIPTA, vol. 37, No. 8, 1992, pp. 23-33.
International Search Report from PCT for PCT application No. PCT/US03/36179, dated Oct. 14, 2004 (11 pgs).
Current Claims in PCT patent application No. PCT/US03/36179 (7 pgs).
International Searching Authority, "Invitation to Pay Additional Fees," May 25, 2004, 5 pages.
Current Claims in PCT patent application, International Application Number PCT/US03/36179, 7 pages.
Kou Kobayashi et al., "Spatially Divided Channel Scheme using Sectored Antennas for CSMA/CA—'Directional CSMA/CA'," IEEE, vol. 1, Sep. 18, 2000, XP010520636, pp. 227-231.
Asis Nasipuri et al., "Power Consumption and Throughput in Mobile Ad Hoc Networks using Directional Antennas," IEEE, Oct. 14, 2002, XP010610949, pp. 620-626.
Bill McFarland et al., "A 2.4 & 5 GHz Dual Band 802.11 WLAN Supporting Data Rates to 108 Mb/s," IEEE, Oct. 20, 2002, XP010616113, GAAS IC Symposium, 24th Annual IEEE Gallium Arsenide Integrated Circuit Symposium, Technical Digest 2002, Monterey, CA, Oct. 20-23, 2002, pp. 11-14.
European Patent Office, "Communication Pursuant to Article 96(2) EPC," App. No. 04801902.0, dated Sep. 1, 2006, 8 pages.
Current Claims, EP App. No. 04801902.0, 14 pages, Sep. 1, 2006.
European Patent Office, "Partial European Search Report", EP Application No. 06014053.0-2416, dated Sep. 18, 2006, 6 pgs.
Current Claims, EP Application No. 06014053.0-2416, 11 pgs, Sep. 18, 2006.
Stern, Jim H., "Fixed Cell Assignments for Forward Link in Broadband Wireless Networks," 2000, IEEE, pp. 1-6.
European Patent Office, "Communication pursuant to Article 96(2) EPC," EP App. 03783375.3 (52637-0073), dated Apr. 4, 2007, 7 pages.
Claims for EP App. 03783375.3 (52637-0073), 8 pages.

* cited by examiner

MULTIPLE ACCESS WIRELESS COMMUNICATIONS ARCHITECTURE

RELATED APPLICATIONS AND CLAIM OF PRIORITY

This application claims priority from U.S. Provisional Patent Application No. 60/428,456, entitled "Approach For Using Spatial Division To Increase Throughput In A Wireless Communication System," filed Nov. 21, 2002, the contents of which are incorporated herein by reference in its entirety for all purposes.

FIELD OF THE INVENTION

This invention relates generally to wireless communications systems and, more specifically, to a spatial division multiple access wireless communications architecture.

BACKGROUND OF THE INVENTION

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

A communications network is any system or mechanism that provides for the exchange of information or data between participants. In existing wireless communications networks, such as a wireless Local Area Networks (LANs) or Personal Area Networks (PANs), a wireless access point functions as a transceiver in communicating with a number of wireless devices. As used herein, the term "wireless device" refers to any type of device that uses a wireless communications protocol to communicate. Example wireless devices include, without limitation, desktop, laptop and handheld computers, Personal Digital Assistants (PDAs), cell phones and various other portable devices. The radiation pattern of wireless access points is usually omni directional, i.e., the wireless access point transmits information in 360 degrees, so that all wireless devices within range of the wireless access points receive all transmitted signals. Wireless access points also perform various management functions, such as selecting specific frequencies on which to transmit data to particular wireless devices in the system.

One ongoing issue with wireless communications architectures is how to increase the number of wireless devices that can simultaneously communicate within a specified physical area given a fixed amount of allocated electromagnetic spectrum. This is particularly important when a number of wireless devices in the specified area are attempting to simultaneously communicate with a wireless access point to access a communications network, such as the Internet. For example, it is not uncommon for large numbers of users to use laptop computers to access the Internet during tradeshows and conferences. As another example, in some corporate offices, many users share wireless access points to access the Internet with laptop computers. As yet another example, many coffee shops now offer free wireless Internet access to customers. All of these situations strain the available access resources since only a limited number of available communications channels must be shared by all participants. For example, the IEEE 802.11(b) standard in the FCC regulatory domain, sometimes referred to as "WiFi", defines 11 communications channels. Thus, assuming that each channel is dedicated to a single user, only 11 users can communicate simultaneously.

Conventional approaches for addressing this problem include employing multiple access communications protocols to increase the number of wireless devices that can simultaneously access a wireless access point. Example multiple access communications protocols include, without limitations, Frequency Division Multiple Access (FDMA), Time Division Multiple Access (TDMA) and Code Division Multiple Access (CDMA). The use of multiple access communications protocols can significantly increase the number of wireless devices that can operate simultaneously on a specified set of communications channels. For example, the use of TDMA can triple the number of wireless devices that can share a specified set of communications channels compared to FDMA. Even using TDMA however, a wireless access point can communicate to only one wireless device in any one timeslot. Furthermore for any wireless device to communicate to another wireless device or to the wired network, it must transmit its data to the wireless access point. The wireless access point then transmits the data to another wireless device or to the wired infrastructure, such as the Internet. The throughput of the network is therefore necessarily limited by the throughput of communications between the wireless access point and any one wireless device at a particular point in time. Consequently, in existing systems, the amount of data that can be transferred at any one timeslot is equal to the throughput of the link from the wireless access point to the particular wireless device to which it is communicating. All other wireless devices are in a state waiting for a free time slot to transmit or receive a quantum of data.

Based on the foregoing, there is a need for a wireless communications architecture that does not suffer from limitations in prior approaches is highly desirable. There is a particular need for a wireless communications architecture that allows a greater number of wireless devices to communicate simultaneously.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. In some instances, flow diagrams are used to depict steps performed in various embodiments of the invention. The invention is not limited to the particular order of steps depicted in the figures and the order may vary, depending upon the requirements of a particular implementation. Furthermore, steps that are depicted and described may be removed and/or other steps may be added, depending upon the requirements of a particular implementation. Various aspects of the invention are described hereinafter in the following sections:
I. OVERVIEW
II. OPERATIONAL OVERVIEW
III. WIRELESS COMMUNICATIONS APPARATUS
IV. COMMUNICATIONS CHANNELS, PROTOCOLS AND MULTIPLE ACCESS SCHEMES
V. INTERFERENCE MITIGATION AND POWER CONTROL
VI. ANTENNA CONFIGURATIONS
VII. IMPLEMENTATION MECHANISMS, ALTERNATIVES & EXTENSIONS I. Overview A multiple access wireless communications architecture provides selective, simultaneous communications with wireless devices located in different sectors. This includes communications between wireless devices in a single sector, between wireless devices in different sectors and between wireless devices and a wired network or wireless backhaul network. As used herein, the term "sector" refers to a portion or section of a spatial area around a communications apparatus.

The wireless communications architecture generally includes two or more wireless antenna arrangements that are each configured to provide communications with wireless devices located in a particular sector. Each wireless antenna arrangement is further configured to determine whether signals are being communicated on a communications channel before transmitting on the communications channel. This may be implemented, for example, using a carrier sense or energy detection mechanism. Wireless devices within a sector may communicate on the same or different communications channels, depending upon the particular multiple access protocol employed. For example, TDMA or CSMA may be used to allow wireless devices in a sector to share communications channels. Communications channels may also be used simultaneously in different sectors by different wireless devices.

II. Operational Overview

Figure 1A:
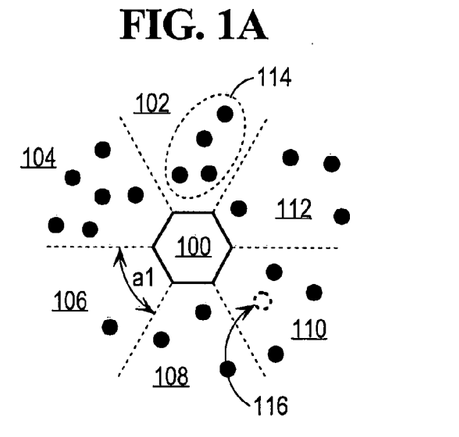
FIGS. 1A–1G are block diagrams of a wireless communications apparatus configured in accordance with an embodiment of the invention.

FIG. 1A is a block diagram of a wireless communications apparatus 100 configured in accordance with an embodiment of the invention. Apparatus 100 is configured to allow selective communications with wireless devices located in sectors identified by reference numerals 102, 104, 106, 108, 110 and 112. As depicted in FIG. 1A, each sector 102–112 includes one or more wireless devices. For example, sector 102 includes four wireless devices identified generally by reference numeral 114.

According to one embodiment of the invention, each sector 102–112 is a portion or section of a spatial area around apparatus 100. Each sector 102–112 may be defined by a specified angle with respect to apparatus 100. For example, sector 106 is an area defined by an angle a1, with respect to apparatus 100. Sectors 102–112 may be defined by the same angle, or different angles. In the present example, sectors 102–112 are each defined by an angle of sixty degrees. Each sector 102–112 may also be defined by radius with respect to apparatus 100.

Apparatus 100 is configured to allow selective communications with wireless devices in any number of sectors and the sectors do not need to be contiguous or provide complete coverage around apparatus 100. The number, location and size of sectors 102–112 may be selected based upon a wide variety of configuration criteria, depending upon the requirements of a particular implementation. Also, the size of sectors 102–112 may be the same, or vary, depending upon the requirements of a particular implementation. Example configuration criteria include, without limitation, the expected numbers and locations of wireless devices and physical constraints of a particular implementation. For example, when implemented in a building to provide wireless access to a network, the number and locations of wireless devices that will require wireless access to the network may be considered. Also, the locations of walls and other physical obstacles, as well as the locations of noise sources and other wireless access apparati may also be considered. In outdoor applications, the types and locations of natural obstacles as well as buildings and other interference sources may be considered.

Figure 1B:
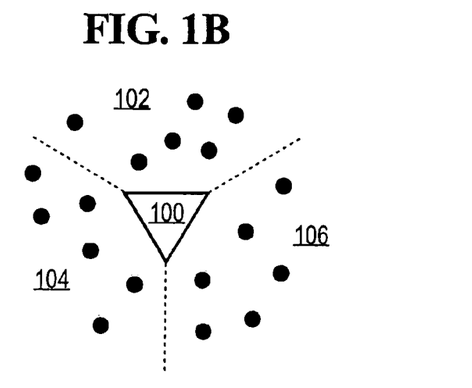
Figure 1C:
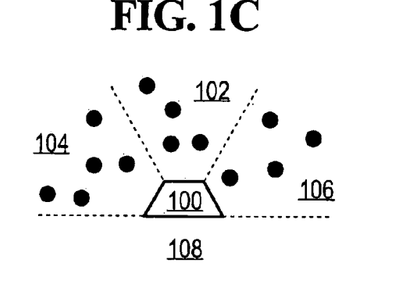
Figure 1D:
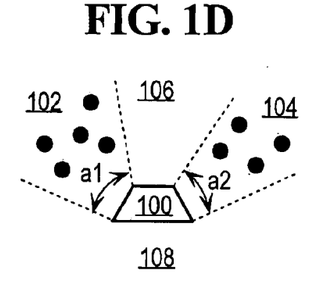

FIGS. 1B–1D depict example configurations for apparatus 100 to allow selective communications with wireless devices located in different sectors. Specifically, FIG. 1B is a block diagram of apparatus 100 configured to allow selective communications with wireless devices located in three sectors 102–106. FIG. 1C is a block diagram of apparatus 100 also configured to allow selective communications with wireless devices located in three sectors 102–106. In FIG. 1C, however, sectors 102–106 are located on one side of apparatus 100. This configuration may be used, for example, in situations where coverage is only desired in sectors 102–106 as depicted in FIG. 1C. One example situation is where apparatus 100 is physically located within a building in a location where wireless devices will only be located in sectors 102–106 as depicted in FIG. 1C with respect to apparatus 100. FIG. 1D is a block diagram of apparatus 100 configured to allow selective communications with wireless devices located in two sectors 102, 104, but not in sectors 106, 108. Sectors 102, 104 are generally angular-shaped areas defined by angles a1 and a2, respectively. This configuration may be used, for example, in situations where it is known that wireless devices are to be located in sectors 102, 104, but not in sectors 106, 108. As depicted in FIG. 1D, apparatus 100 may be configured to allow selective communications in any number of sectors, of varying sizes and locations.

Wireless communications environments often change over time. Changes may be attributable to the introduction of new noise sources or to mobile wireless devices changing locations over time. For example, in FIG. 1A, suppose that a mobile wireless device 116 moves from sector 108 to sector 110. As described in more detail hereinafter, apparatus 100 is configured to automatically detect that the move has occurred and to re-assign mobile wireless device 116 from sector 108 to 110 and perform any required updates of configuration data and data structures maintained by apparatus 100. A frequency or timeslot assigned the mobile wireless device 116 may also be changed, depending upon the requirements of a particular application. In CSMA applications, this may not be required, since mobile wireless device 116 will automatically sense when it can begin communicating in sector 110.

According to one embodiment of the invention, the configuration of apparatus 100 may be dynamically changed over time to change one or more attributes of sectors 102–112. This may include, for example, increasing or decreasing the number of sectors and/or changing the size or shape of existing sectors. The configuration of apparatus 100 may be changed for any reason. For example, apparatus 100 may be moved to a different physical location, where it is desirable to change the location or size of the sectors to provide better coverage. As another example, wireless devices may move to different locations over time.

Figure 1E:
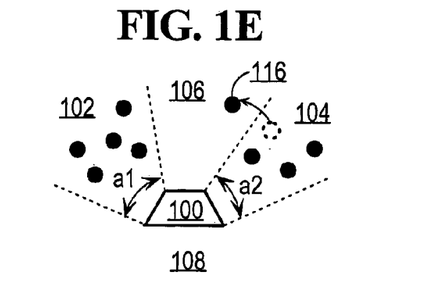
Figure 1F:
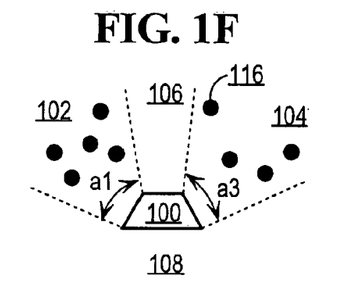

FIG. 1E is a block diagram similar to FIG. 1D, except that a wireless device 118 has moved from sector 104 to sector 106. Since apparatus 100 is not configured to allow wireless communications in sector 106, wireless device 118 no longer has wireless communications supported by apparatus 100. As depicted in FIG. 1F, the configuration of apparatus 100 is dynamically changed to expand sector 104 to provide wireless communications for wireless device 118. The angle of sector 104 has been changed from a2, as depicted in FIG. 1E, to a3, as depicted in FIG. 1F.

Sectors may be dynamically changed to address other conditions, for example for load balancing purposes. In this situation, the size (angle) of sectors are changed to increase or decrease the number of wireless devices in particular sectors to provide better load balancing, thereby increasing throughput. Sectors may also be sub-divided into multiple sub-sectors, to further reduce the number wireless devices in any particular sub-sector. Sectors may also be overlapped, for example using different communications channels, to reduce the number of wireless devices operating on any particular communications channel.

The aforementioned reconfiguration of apparatus 100 may be performed using a variety of techniques, depending upon the requirements of a particular implementation. For example, the physical configuration of one or more antenna elements may be changed to change the size or shape of corresponding sectors. Changing the physical configuration of an antenna element may include several things, such as moving or re-orienting the antenna element, making physical adjustments to or re-sizing the antenna element, or even exchanging the antenna element with a different antenna element.

Instead of changing the physical configuration of an antenna element, the reconfiguration of apparatus 100 may be done by changing the electrical configuration of the apparatus 100 to change the associated sectors, for example using a beam forming network. The beam forming network may be configured to vary the amplitude and relative phase on each beam forming element to change the attributes of the beam, e.g., to create narrow or wide beams and to change the direction of the beams. Varactors may be used for this purpose. A point coordinator function or a distributed coordinator function may be used.

Instead of changing the physical configuration of an antenna element, the reconfiguration of apparatus 100 may be done by changing the electrical configuration of the apparatus 100 to change the associated sectors, for example by allocating the same channel frequency to adjacent sectors. This may be performed by either a power dividing network at the radio frequency level or utilizing a protocol such as CSMA or other point coordination function at the software level.

III. Wireless Communications Apparatus

Figure 2:
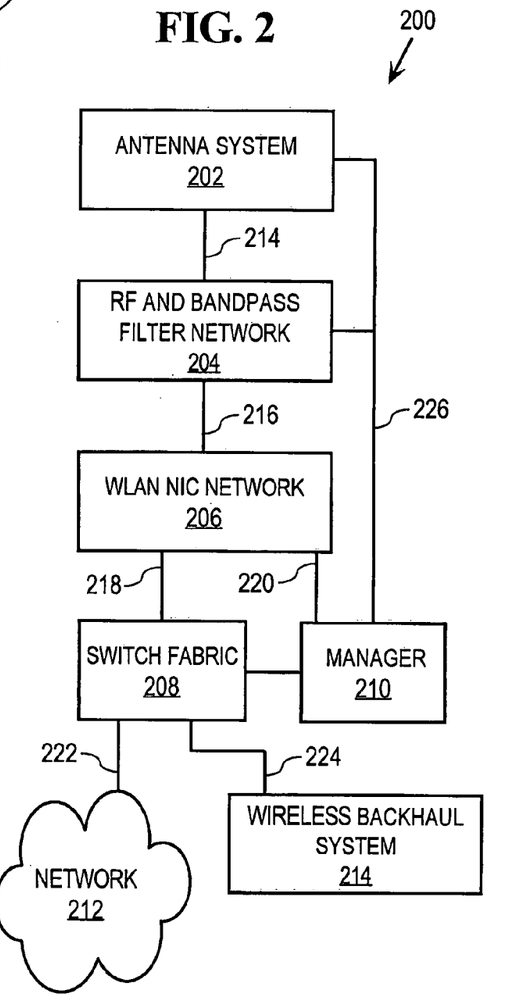
FIG. 2 is a block diagram that depicts a wireless communications apparatus configured in accordance with an embodiment of the invention.

FIG. 2 is a block diagram that depicts a wireless communications apparatus 200 configured in accordance with an embodiment of the invention. Apparatus 200 includes an antenna system 202, a Radio Frequency (RF) and bandpass filter network 204, a Wireless Local Area Network (WLAN) Network Interface Card (NIC) network 206 or silicon that performs the function of the multiplicity of WLAN transceivers, a switch fabric 208 and a manager 210.

According to one embodiment of the invention, the antenna system transmits and receives electromagnetic radiation in a particular spatial direction. The antenna system has the property that the radiation it transmits and receives other than from the desired spatial location is minimized.

According to one embodiment of the invention, the antenna system has multiple transmit and receive antennas in any sector. The wireless communication system has the property that it transmits and receives radiation from any on of the radiating elements. The communication system chooses which radiating element to transmit or receive in a particular sector to maximize performance.

According to one embodiment of the invention, RF and bandpass filter network 204 is configured to perform two functions. First, RF and bandpass filter network 204 is configured to perform band separation and separate out one or more frequency bands from the RF signals provided by antenna system 202. For example, this may involve processing the RF signal from antenna system 202 to obtain 2.4 and 5 GHz signals. Second, RF and bandpass filter network 204 is configured to perform channelization within each frequency band to improve system performance. The output of RF and bandpass filter network 204 is provided to WLAN NIC network 206.

RF and bandpass filter network 204 may include a beam-forming pointing network to dynamically change the angles of sectors 102–112. This function allows the size and/or location of sectors 102–112 to be dynamically changed.

According to one embodiment of the invention, RF and bandpass filter network 204 is configured to join multiple sectors 102–112. This includes allowing a signal to be transmitted to or received from multiple sectors 102–112 simultaneously. This may be useful, for example, for increasing range in low isolation antenna systems at the expense of throughput.

According to another embodiment of the invention, RF and bandpass filter network 204 may be omitted and protocol software may provide the appearance of joint multiple sectors 102–112. This includes allowing a signal to be transmitted to or received from multiple sectors 102–112 simultaneously.

WLAN NIC network 206 is configured generally to change RF signals from RF and bandpass filter network 204 into digital signals in the form of data packets. According to one embodiment of the invention, WLAN NIC network 206 is configured to amplify the RF energy before performing frequency translation of the signal to base band separating the signal into its in-phase and quadrature components. The respective components of the signal are sampled and demodulated into their constituent bits as specified by an applicable standard, for example, the IEEE 802.11 standard. The WLAN NIC network 206 may also be configured to provide de-scrambling, error correction and low-level protocol functions, for example, RTS/CTS generation and acknowledgment, fragmentation and de-fragmentation, and automatic beacon monitoring. The decoded bits are grouped into packets, for example as specified by the IEEE standard, and then provided to switch fabric 208 and manager 210.

Switch fabric 208 is coupled between WLAN NIC network 206 and a network 212, such as a Local Area Network (LAN), Wide Area Network (WAN) or the Internet, and/or to a wireless backhaul system 214. Wireless backhaul system 214 may include a WLAN backhaul NIC and a WLAN backhaul radiating element that are not depicted in FIG. 2 for simplicity.

Manager 210 is configured to perform a variety of management and control functions in apparatus 200. The particular functions performed by manager 210 may vary, depending upon the requirements of a particular application, and the invention is not limited to manager 210 performing any particular tasks. Example management and control functions include, without limitation, managing overall system and sector configuration, managing the frequency bands, communications channels and communications protocols for each sector, managing security protocols, managing the transmit power level and receive sensitivity for each sector, detecting and alerting network administrators the presence of non-authorized or interfering access points and managing communications between wireless devices and between wireless devices and network 212 and wireless backhaul system 214. Each of these management functions is described in more detail hereinafter.

According to one embodiment of the invention, manager 210 is configured to control switch fabric 208 to provide for the selective exchange of data between wireless devices in any particular sector 102–112 and also between wireless devices in different sectors 102–112. Manager 210 is also configured to perform switching functions to provide for the selective exchange of data between sectors 102–112 and network 212 and between sectors 102–112 and a wireless network connected to wireless backhaul system 214.

According to one embodiment of the invention, manager 210 is also configured to aggregate data from multiple wireless devices in one or more sectors, and cause the aggregated data to be transmitted onto network 212 or the wireless network connected to wireless backhaul system 214. For example, in FIG. 1A, manager 210 is configured to aggregate data from sectors 102–110 and transmit the aggregated data onto network 212 or to wireless network via wireless backhaul system 214. According to one embodiment of the invention, manager 210 transmits the aggregated data onto network 212 or to wireless network via wireless backhaul system 214 via one or more ports. As described in more detail hereinafter, manager 210 is also configured to manage the communications channels used to communicate with wireless devices and to manage the transmit power and receive sensitivities of each sector 102–112.

According to one embodiment of the invention, manager 210 is also configured to maintain configuration data that defines the configuration and operation of apparatus 100. The configuration data may be stored on a volatile storage, such as a RAM, or a non-volatile storage, such as one or more disks or in a database, depending upon the requirements of a particular application. The configuration data may specify, for example, the configuration of the overall system and each sector, information about each wireless device, such as identification and device type information as well as the sector location of each wireless device. The configuration data may also specify a current set of selected communications channels, the particular communications channels to be used in each sector and by each wireless device and the particular frequency bands and communications protocols to be used in each sector and/or by each wireless device. As another example, the configuration data may specify a transmit power level and receive sensitivity for each sector. Manager 210 is also configured to update the configuration information in response to various events.

According to one embodiment of the invention, manager 210 is configured to manage the movement of wireless devices between sectors. This may include, for example, re-assigning communications channels and time slots and updating other information relating to the wireless devices that moved. Suppose that a particular wireless device moves from sector 102 to sector 104. In this situation, manager 210 may assign a new communications channel to the particular wireless device, for example if the current communications channel of the particular wireless device is not being used in sector 104. Manager 210 then updates the configuration information to reflect that the particular wireless device is now located in sector 104 and that communications with the particular wireless device are now to be made using the new assigned communications channel.

Antenna system 202, RF and bandpass filter network 204, WLAN NIC network 206, switch fabric 208, manager 210, network 212 and wireless backhaul system 214 are communicatively coupled by links 216, 218, 220, 222 and 224, as depicted in FIG. 2. Links 216–224 may be implemented by any medium or mechanism that provides for the exchange of data between these elements. Examples of links 216–224 include, without limitation, a network such as a Local Area Network (LAN), Wide Area Network (WAN), Ethernet or the Internet, or one or more terrestrial, satellite or wireless links. A link 226 provides for the exchange of control signals between manager 210 and antenna system 202, RF and bandpass filter network 204, WLAN NIC Network 206 and switch fabric 208.

Figure 3A:
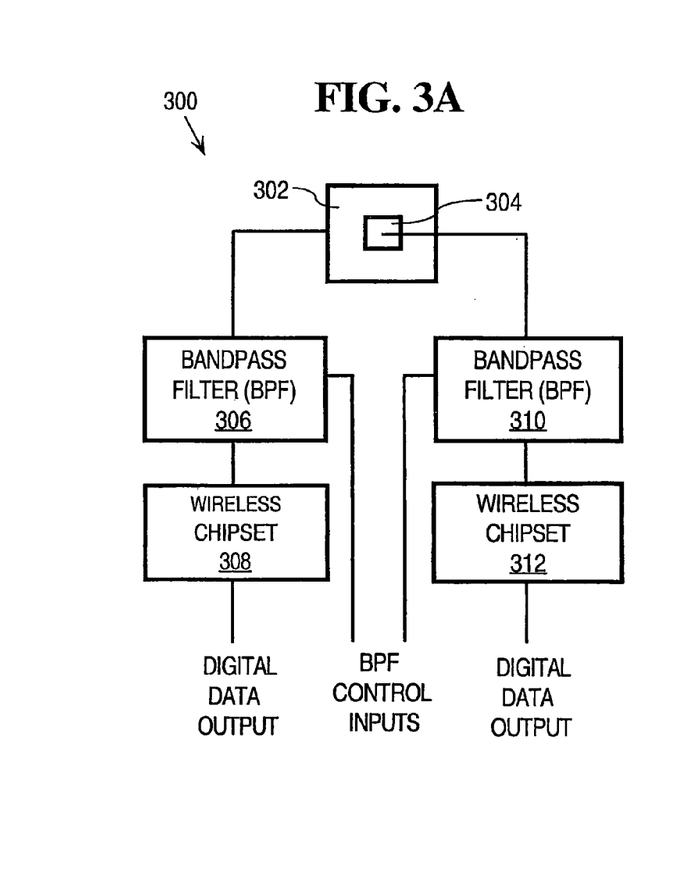
FIG. 3A is a block diagram that depicts a wireless communications architecture 300 configured in accordance with another embodiment of the invention.

FIG. 3A is a block diagram that depicts a wireless communications architecture 300 configured in accordance with another embodiment of the invention. Architecture 300 includes antenna elements, examples of these elements may be dipoles, patch elements 302 or other antenna systems, 304 that are configured to transmit on two different frequency bands. Antenna element 302 is coupled to a bandpass filter (BPF) 306 that is coupled to a wireless chipset 308. Antenna element 304 is coupled to a BPF 310 that is coupled to a wireless chipset 312. BPFs 306, 308 are controllable by BPF control inputs from a control apparatus, such as management processor and switch fabric 208. Wireless chipsets 308, 312 convert RF signals into digital signals that are provided on digital data outputs. The digital signals may be provided in the form of data packets that are provided to and switched by management processor and switch fabric 208.

Figure 3B:
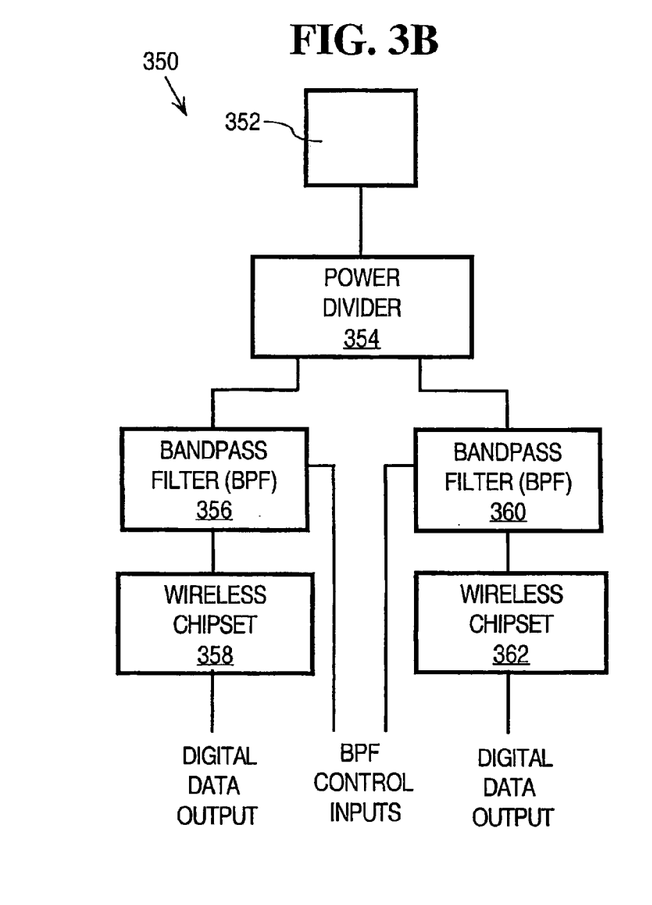
FIG. 3B is a block diagram that depicts a wireless communications architecture 350 configured in accordance with another embodiment of the invention.

FIG. 3B is a block diagram that depicts a wireless communications architecture 350 configured in accordance with another embodiment of the invention. In architecture 350, a dual frequency or ultra wideband antenna element 352 is coupled to a power divider 354. Power divider 354 is coupled to a BPF 356 that is coupled to a wireless chipset 358. Power divider 354 is also coupled to a BPF 360 that is coupled to a wireless chipset 362. As in FIG. 3A, BPFs 356, 358 are controllable by BPF control inputs from a control apparatus, such as manager 210. Also, wireless chipsets 358, 362 convert RF signals into digital signals that are provided on digital data outputs. The digital signals may be provided in the form of data packets that are provided to and switched by manager 210.

Although depicted in FIGS. 3A and 3B as discrete components, BPFs 306, 308 and 356, 360 and wireless chipsets 308, 310 and 358, 362 may be integrated into a single component. Also, BPFs 306, 308, 356, 360 may not be used in some applications, at the expense of performance.

IV. Communications Channels, Protocols and Multiple Access Schemes

Any type of communications channel allocation scheme may be used with the wireless communications architecture described herein. The allocation of communications channels to sectors 102–112 may vary depending upon the requirements of a particular implementation and the invention is not limited to any particular channel allocation scheme. Manager 210 is configured to manage the communications channels use to communicate with wireless devices. This may include, for example, determining initial communications channels to be used by wireless devices which may be based on isolation, interference or anything other factor affecting performance, assigning communications channels and timeslots to wireless devices and selecting communications protocols. This may also include periodically checking the performance of selected communications channels and dynamically changing the communications channels used by wireless devices. This may include selecting a set of communications channels to be used in each sector based upon communications channel performance.

As described in more detail hereinafter, apparatus 100 may be configured to support multiple frequency bands operating simultaneously. Different frequency bands may be used in different sectors, or even in the same sector. For example, apparatus 100 may be configured with antenna elements and associated electronics to support communications on both the 2.4 Ghz and 5 Ghz frequency bands. Apparatus 100 may also be configured to support any type and number of communications protocols. Example protocols supported by apparatus 100 include, without limitations, the IEEE 802.11(x) communications protocols, such as 802.11(a), (b), (g), the 802.15(x) and 802.16(x) communications protocols, and other future communications protocols.

Apparatus 100 may also be configured to support any type and number of multiple access schemes to support communications with multiple wireless devices. For example, a Carrier Sense Multiple Access (CSMA), carrier detect or energy detect scheme may be employed to allow multiple wireless devices to communicate using a specified set of communications channels. The wireless devices then communicate on the allocated set of channels using a multiple access scheme such as FDMA or TDMA.

V. Interference Mitigation and Power Control

Wireless communications apparatus 100 may be configured to reduce the amount of interference between wireless devices in different sectors 102–112. It is extremely difficult, if not impossible, to completely eliminate all interference between sectors because of the presence of main and side lobes. The general goal, therefore, is to reduce the amount of interference between sectors to below a specified level to provide reliable performance and an acceptable level of quality of service. For example, according to one embodiment of the invention, various techniques are employed to reduce the magnitude of side lobes generated by each sector to reduce the likelihood that transmissions from one sector will trigger a carrier or energy detection algorithm of another sector. Reducing the amount of interference between sectors may also allow the same communications channels to be re-used, i.e., used simultaneously in more than one sector. This greatly increases the number of wireless devices that can be supported by apparatus 100 given a limited amount of available frequency spectrum.

Configuring apparatus 100 to reduce interference between wireless devices in different sectors may take many forms. For example, as described hereinafter in more detail, one or more antenna elements may be physically configured to reduce interference between wireless devices in different sectors. This may include selecting materials and physically constructing antenna elements in a manner to reduce interference between sectors. Also, the polarization of one or more antenna elements may be changed to reduce the amount of interference between wireless devices in different sectors. For example, the polarization orientation of adjacent sectors 102–112 may be varied to reduce interference between wireless devices operating in adjacent sectors 102–112. For example, an antenna element that provides communications with wireless devices in sector 102 may have a first polarization orientation. An antenna element that provides communications with wireless devices in sector 104 may have a second polarization orientation, that is oriented at some angle to the first. This may be ninety degrees with respect to the antenna element for sector 102.

According to one embodiment of the invention, communications channels are selected to reduce interference between sectors and to provide a specified level of quality of service. For example, the IEEE 802.11(b) protocol specifies communications on eleven communications channels, of which three (channels 1, 6, 11) are non-overlapping. Thus, in a three sector configuration, manager 210 may specify that communication channels 1, 6 and 11 are to be used for the three sectors to reduce the amount of interference and provide more favorable quality of service. In situations where a communications protocol is employed that does not include non-overlapping channels, then a testing scheme may be used to identify an optimal assignment of communications channels to achieve specified interference and quality of service levels. This may include initial test to identify an optimal set of initial communications channels to be assigned to the sectors, as well as subsequent periodic testing to provide an updated set of optimal communications channels.

Figure 1G:
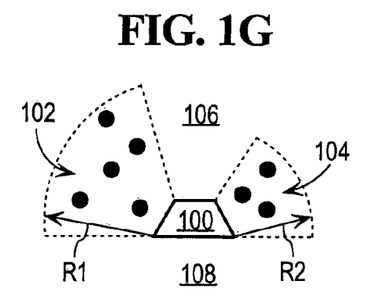

According to one embodiment of the invention, transmit power levels and receive sensitivities are selected to optimize communications and reduce interference between sectors. Transmit power levels and receive sensitivities may be selected on a per sector, per wireless device, or even per packet basis, depending upon the requirements of a particular implementation. Varying the transmit power level generally changes the size of a transmission area. For example, in FIG. 1G, the transmit power levels of apparatus 100 are selected to cause sector 102 to have a radius of R1 and sector 104 to have a radius of R2. In this example, the wireless devices in sector 104 are located relatively closer to apparatus 100 than the wireless devices in sector 102. Thus, less power needs to be used with the antenna element associated with sector 104, relative to the antenna element associated with sector 102.

Selectively adjusting the transmit power for each sector serviced by apparatus 100 reduces the overall power consumed by apparatus 100, reduces the possible interference between sectors 102 and 104, and improves security. Varying the receive sensitivity for a particular sector changes the general sensitivity to the particular sector to transmissions from other sectors and other types of interference. According to one embodiment of the invention, the receive sensitivity for a sector is optimized to provide a specified quality of service for wireless devices in the sector, while reducing the likelihood of interference. The transmit power level and receive sensitivities may be adjusted together to optimize sector performance.

Transmit power levels and receive sensitivities may be dynamically adjusted over time to compensate for changing conditions. This may include, for example, changes in the configuration of apparatus 100, changes in the locations and numbers of wireless devices, changes in the frequency band or channels being used, changing power or quality of service requirements and changes in interference sources.

VI. Antenna Configurations

Figure 4A:
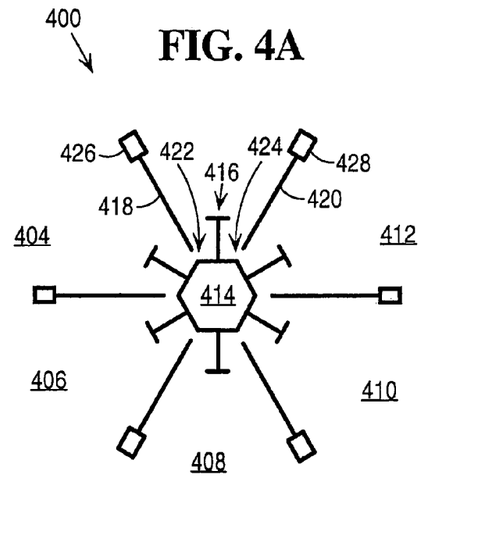
FIG. 4A is a block diagram that depicts a top view of an antenna apparatus configured in accordance with an embodiment of the invention.

Various antenna configurations may be employed with the wireless communications architecture described herein, depending upon the requirements of a particular application. FIG. 4A is a block diagram that depicts a top view of an antenna apparatus 400 used with antenna system 202. Antenna apparatus 400 includes various antenna elements configured to provide wireless communications with wireless devices located in sectors 402–412. Specifically, antenna apparatus 400 includes a center reflector portion 414. With respect to sector 402, antenna apparatus 400 includes a radiating assembly 416 configured to radiate electromagnetic energy into sector 402. Antenna apparatus 400 also includes metal septums 418, 420 that are configured to define sector 402. Metal septums 418, 420 may be separated from center reflector portion 414, as indicated by apertures 422, 424, to reduce coupling between sector 402 and the other sectors 404–412. According to one embodiment of the invention, septums 418, 420 are positioned from center reflector portion 414 at a distance that is proportional to the transmission wavelength. Antenna apparatus 400 also includes RF chokes 426, 428, coupled to the ends of metal septums 418, 420.

Figure 4B:
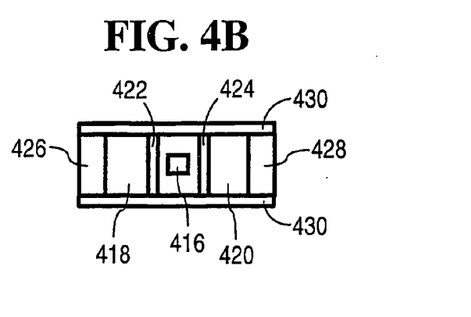
FIG. 4B is a side view of the antenna apparatus of FIG. 4A.

Antenna apparatus 400 may also includes radio frequency absorptive material, such as foam or other material or photonic bandgap structures, disposed between the metal septums and the top and bottom of antenna apparatus 400 to further reduce coupling between sectors. For example, FIG. 4B is a side view of antenna apparatus 400 depicting the various components of FIG. 4A. As depicted in FIG. 4B, radio frequency absorptive material 430 is disposed on top and bottom of septums 418, 420 to reduce electromagnetic coupling between sectors 402–412.

Although antenna apparatus 400 has been described in the context of sector 402, antenna apparatus 400 includes similar antenna elements for the other sectors 404–412. The dimensions and characteristics of the other antenna elements that provide wireless communications for sectors 404–412 may be the same as or different from the aforementioned antenna elements that provide wireless communications for sector 402.

Figure 5A:
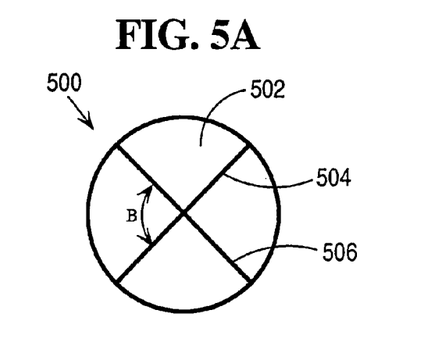
FIG. 5A is a block diagram of an end view of a radiating assembly configured in accordance with an embodiment of the invention.

FIG. 5A is a block diagram of an end view of a radiating assembly 500 configured in accordance with an embodiment of the invention. Radiating assembly 500 may be used for radiating assembly 416 in antenna apparatus 400. Radiating assembly 500 includes a base 502 and patch elements 504, 506 attached thereto. Patch elements 504, 506 may be built upon a PCB such as FR4, or other dielectric substrate. Although radiating assembly 500 is configured with two patch elements 504, 506, radiating assembly 500 may be configured with a single patch element, depending upon the requirements of a particular implementation. Patch elements 504, 506 are oriented with respect to each other at an angle B, as depicted in FIG. 5A, to introduce polarization diversity. According to one embodiment of the invention, patch elements 504, 506 are oriented at approximately ninety degrees with respect to each other, although other angles may be used, depending upon the requirements of a particular application. Radiating assembly 500 may also be oriented with respect to other radiating assemblies in an antenna apparatus to decrease polarization alignment and provide greater isolation between sectors. For example, radiating assembly 416 for sector 402 may be oriented with respect to the radiating assemblies for sectors 404–412 to decrease polarization alignment and provide greater isolation between sectors 402 and 404–412.

Figure 5B:
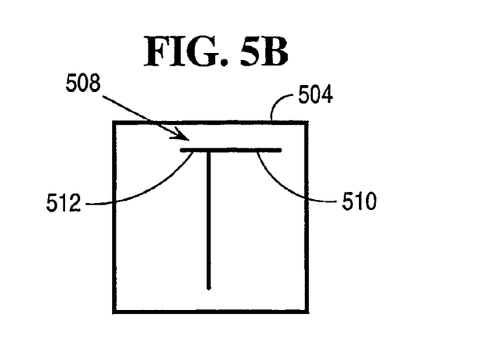
FIG. 5B is a block diagram that depicts a patch element configured according to one embodiment of the invention.

FIG. 5B is a block diagram that depicts patch element 504 configured according to one embodiment of the invention. In this embodiment, patch element 504 is duel frequency and includes a radiating element 508. Radiating element 508 is generally "T" shaped and includes a long microstrip 510 for low frequency operation and a short microstrip 512 for high frequency operation. Two microstrips 510, 512 are not required by the invention, and some implementations may have only a single microstrip where communications in only single frequency band are required. As an alternative to using the "T" shaped radiating element 508 in dual-band applications, two separate patch elements may be used, where one of the patch elements is a small patch element that includes a low frequency microstrip and the other larger patch element includes a high frequency microstrip. In this situation, the smaller high frequency patch element may be suspended above the larger lower frequency patch element.

VII. Implementation Mechanisms, Alternatives & Extensions

The wireless communications architecture described herein may be implemented in hardware, software, or any combination of hardware and software. For example, manager 210 may be implemented using a generic computing platform that executes various software programs to perform the functions described herein.

Figure 6:
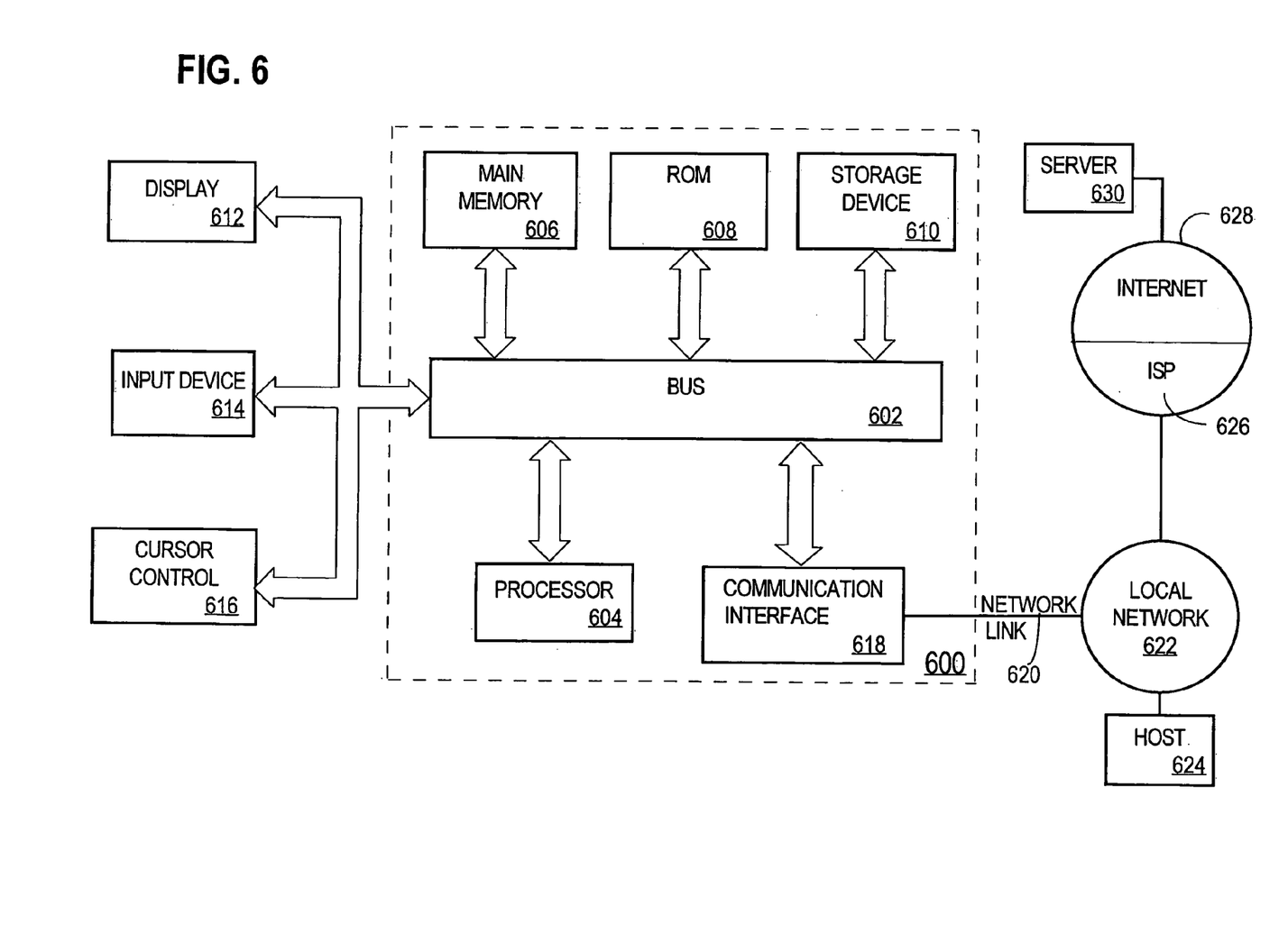
FIG. 6 is a block diagram that depicts a computer system on which embodiments of the present invention may be implemented.

FIG. 6 is a block diagram that illustrates an example computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 in a wireless communications architecture. According to one embodiment of the invention, wireless communications are provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application manages a wireless communications architecture as described herein.

Processor 604 may execute the code as it is received, and/or stored in storage device 610, or other non-volatile storage for later execution. In this manner, computer system 600 may obtain application code in the form of a carrier wave.

In the foregoing specification, embodiments of the invention have been described with reference to numerous specific details that may vary from implementation to implementation. Thus, the sole and exclusive indicator of what is, and is intended to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A wireless communications apparatus comprising:
   a first antenna arrangement configured to transmit and receive communications signals on a first communications channel within a first section of a spatial area around the wireless communications apparatus, wherein the first antenna arrangement is further configured to determine whether the first communications channel is currently being used to carry communication signals before transmitting any communication signals onto the first communications channel, wherein the first antenna arrangement is further configured to selectively and separately manage transmit power levels with wireless devices in the first section of the spatial area around the wireless communications apparatus on a per-wireless device basis; and a second antenna arrangement configured to transmit and receive communications signals on a second communications channel within a second section of the spatial area around the wireless communications apparatus, wherein the second antenna arrangement is further configured to determine whether the second communications channel is currently being used to carry communication signals before transmitting any communication signals onto the second communications channel, wherein the second antenna arrangement is further configured to selectively and separately manage transmit power levels with wireless devices in the second section of the spatial area around the wireless communications apparatus on a per-wireless device basis.

2. The wireless communications apparatus as recited in claim 1, wherein the first and second sections of the spatial area around the wireless communications apparatus do not overlap and are not adjacent to each other.

3. The wireless communications apparatus as recited in claim 1, wherein the first and second sections of the spatial area around the wireless communications apparatus are adjacent to each other.

4. The wireless communications apparatus as recited in claim 1, wherein the first and second sections of the spatial area around the wireless communications apparatus are different sizes.

5. The wireless communications apparatus as recited in claim 1, wherein the first antenna arrangement is further configured to transmit and receive communications signals on a third communications channel within the first section of the spatial area around the wireless communications apparatus, wherein the third communications channel is on a different frequency within the same frequency band as the first communications channel.

6. The wireless communications apparatus as recited in claim 1, wherein the first antenna arrangement is further configured to transmit and receive communications signals on a third communications channel within the first section of the spatial area around the wireless communications apparatus, wherein the third communications channel is in a different frequency band than the first communications channel.

7. The wireless communications apparatus as recited in claim 6, wherein the first communications channel is in the IEEE 802.11(a) frequency band and the third communications channel is in the IEEE 802.11(b) frequency band.

8. The wireless communications apparatus as recited in claim 1, wherein the first antenna arrangement is further configured to transmit and receive communications signals on the first communications channel using a time division multiple access communications protocol.

9. The wireless communications apparatus as recited in claim 8, wherein a carrier sense mechanism is used to select the first and second communications channels.

10. The wireless communications apparatus as recited in claim 1, wherein the first antenna arrangement is further configured to determine whether the first communications channel is currently being used to carry communication signals before transmitting any communication signals onto the first communications channel using a carrier sense mechanism.

11. The wireless communications apparatus as recited in claim 1, wherein the wireless communications apparatus is a wireless access point communicatively coupled to a wired network.

12. The wireless communications apparatus as recited in claim 1, wherein the first antenna arrangement and the second antenna arrangement are configured to allow simultaneous separate communications on the first and second communications channels.

13. The wireless communications apparatus as recited in claim 12, wherein the first and second communications channels are the same frequency.

14. The wireless communications apparatus as recited in claim 1, wherein the first and second antenna arrangements are configured with different polarization orientations.

15. The wireless communications apparatus as recited in claim 1, wherein the first and second communications channels are selected to reduce interference between the first and second sections.

16. The wireless communications apparatus as recited in claim 1, wherein the first and second antenna arrangements are configured to reduce interference between the first and second sections.

17. The wireless communications apparatus as recited in claim 1, wherein the wireless communications apparatus is configured to dynamically change the size of the first section.

18. The wireless communications apparatus as recited in claim 1, further comprising a manager mechanism configured to aggregate data received from the first and second antenna arrangements.

19. The wireless communications apparatus as recited in claim 1, further comprising a manager mechanism configured to, in response to a wireless device moving from the first section into the second section, updating and storing data that indicates that communications with the wireless device are now to be performed using the second antenna arrangement.

20. The wireless communications apparatus as recited in claim 1, further comprising a switch configured to provide for the switching of data between the first and second antenna arrangements.

21. The wireless communications apparatus as recited in claim 1, further comprising a switch configured to provide for the switching of data between the first antenna arrangement and a network.

22. The wireless communications apparatus as recited in claim 1, wherein the wireless communications apparatus is configured to selectively and separately manage transmit power levels and receive sensitivities for the first and second antenna arrangements.

23. A wireless access point for providing wireless access to a wired network within a building, the wireless access point comprising:
a first antenna arrangement configured to communicate with wireless devices within a first section of a spatial area around the wireless access point, wherein the first antenna arrangement is further configured to determine whether a first communications channel assigned to the first section of the spatial area is currently being used to carry communication signals before transmitting any communication signals onto the first communications channel, wherein the first antenna arrangement is further configured to selectively and separately manage transmit power levels with the wireless devices in the first section of the spatial area around the wireless communications apparatus on a per-wireless device basis;
a second antenna arrangement configured to communicate with wireless devices within a second section of the spatial area around the wireless access point, wherein the second antenna arrangement is further configured to determine whether a second communications channel assigned to the second section of the spatial area is currently being used to carry communication signals before transmitting any communication signals onto the second communications channel, wherein the second antenna arrangement is further configured to selectively and separately manage transmit power levels with the wireless devices in the second section of the spatial area around the wireless communications apparatus on a per-wireless device basis; and a management mechanism configured to manage the operation of the first and second antenna arrangements and to manage the exchange of data between wireless devices in the first and second sections of the spatial area and the wired network in the building.

24. A wireless communications system comprising:

a first antenna arrangement having a first transceiver configured to transmit and receive communications signals on a communications channel within a first section of a spatial area around the wireless communications system, wherein the first antenna arrangement is configured to selectively and separately manage transmit power levels with wireless devices in the first section of the spatial area around the wireless communications system on a per-wireless device basis;

a second antenna arrangement having a second transceiver configured to transmit and receive communications signals on the communications channel within a second section of the spatial area around the wireless communications system, wherein the second antenna arrangement is configured to selectively and separately manage transmit power levels with wireless devices in the second section of the spatial area around the wireless communications system on a per-wireless device basis; and wherein a carrier sense multiple access, collision avoidance algorithm based on carrier sense or energy detect, or a point coordinating function is used to allow communications on the communications channel in both the first and second sections to occur.

25. The wireless communications apparatus as recited in claim 24, further comprising a network manager configured to control the transfer of data between the first and second sections and a network.

* * * * *